United States Patent [19]

Ozawa et al.

[11] Patent Number: 4,631,618
[45] Date of Patent: Dec. 23, 1986

[54] TAPE CASSETTE WITH PROTECTION COVER AND TAPE END SENSING MEANS

[75] Inventors: Kazuo Ozawa, Miyagi; Hideki Nonoyama, Tokyo, both of Japan

[73] Assignee: Sony Corporation, Tokyo, Japan

[21] Appl. No.: 603,749

[22] Filed: Apr. 25, 1984

[30] Foreign Application Priority Data

Apr. 29, 1983 [JP] Japan .................................. 58-75710

[51] Int. Cl.[4] .............................................. G11B 23/02
[52] U.S. Cl. ..................................... 360/132; 360/74.6
[58] Field of Search ............... 360/132, 74.6; 242/197, 242/198, 199, 188

[56] References Cited

U.S. PATENT DOCUMENTS

| | | | |
|---|---|---|---|
| 3,615,155 | 10/1971 | Gelbman | 242/199 |
| 3,638,955 | 2/1972 | Wada | 242/199 |
| 3,705,699 | 12/1972 | Siller | 242/199 |
| 4,032,987 | 6/1977 | Singer et al. | 360/132 |
| 4,091,426 | 5/1978 | Umeda | 360/74.6 |
| 4,343,024 | 8/1982 | Kawai | 360/74.6 |
| 4,363,059 | 12/1982 | Matsuzawa et al. | 360/74.6 |
| 4,524,926 | 6/1985 | Nemoto et al. | 360/132 |

FOREIGN PATENT DOCUMENTS 1254377 11/1967 Fed. Rep. of Germany ..... 360/74.6

Primary Examiner—Robert S. Tupper
Assistant Examiner—Andrew L. Sniezek
Attorney, Agent, or Firm—Hill, Van Santen, Steadman & Simpson

[57] ABSTRACT

A tape cassette with a tape beginning and tape end detecting mechanism is provided wherein a lid is pivotally supported by the cassette casing at its opposite sides to removably cover the front opening of the cassette casing. A sensor chip which forms an optical path is disposed inside and near each of the sides of the cassette casing and a first aperture is formed through each of the sides to expose a part of the sensor chip. A second aperture is formed through each of the sides of the lid. The first and second apertures are located such that when the lid is opened, the first and second apertures become coincident with one another in position, while when the lid is closed, the first and second apertures are displaced relative to one another, and the first aperture is covered by the lid to thereby protect the sensor chip.

1 Claim, 5 Drawing Figures

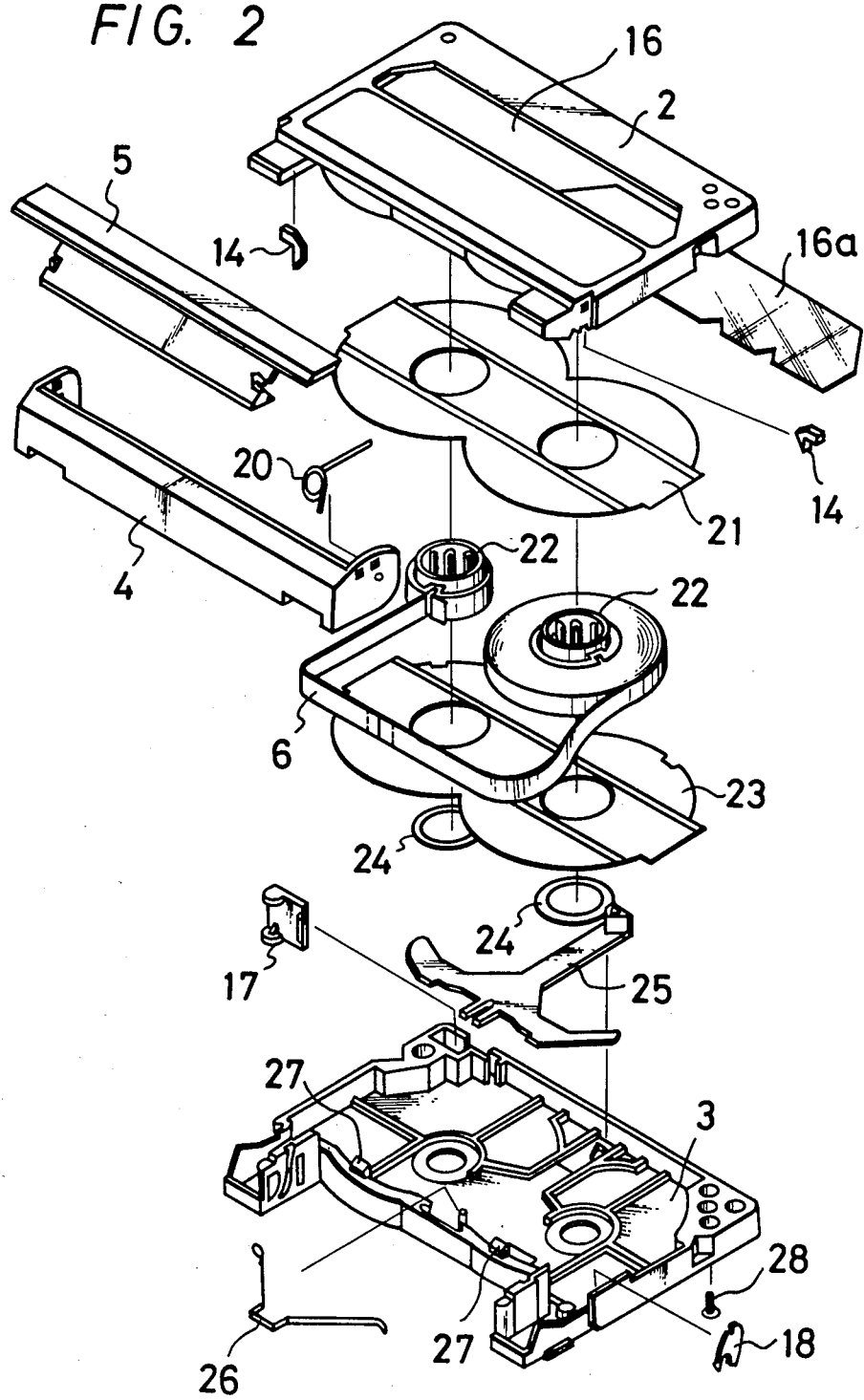

TAPE CASSETTE WITH PROTECTION COVER AND TAPE END SENSING MEANS

BACKGROUND OF THE INVENTION

1. Field of the Invention

The present invention generally relates to a tape cassette and more particularly is directed to a tape cassette suitable in the use of recording and reproducing a digital signal, for example, a PCM (pulse code modulated) signal.

2. Description of the Prior Art

In an ordinary tape cassette such as a standard type tape cassette now widely used in which no lid is provided at its front opening portion, the tape cassette is provided with a tape-end sensing mechanism for sensing the end of tape winding or tape rewinding.

In such tape end sensing mechanisms, it is proposed to electrically sense a small piece of aluminum foil which is attached to, for example, the tape beginning or end, or to optically sense a transparent leader tape which is bonded to the tape beginning or end, etc.

The conventional tape-end sensing means or mechanism to detect the tape beginning or end can easily be provided in such prior systems because the above tape cassette casing has no lid provided at its front opening portion.

However, in a tape cassette in which an analog signal is converted to a PCM signal and then recorded on a tape and in which when it is loaded onto a PCM signal recording and reproducing apparatus, the tape is usually extracted out of the tape cassette, such tape cassette is required to have a lid to prevent fingerprints, dust, or the like from adhering to the tape stretched over the front opening portion of the cassette casing upon non-use. As a result, it is quite difficult to incorporate the tape-end sensing means of the non-lidded tape cassette to one having the lid at its front opening portion. However, it is desired that the above lidded tape cassette be provided with tape-end sensing means.

OBJECTS AND SUMMARY OF THE INVENTION

Accordingly, it is an object of the present invention to provide an improved tape cassette.

It is another object of the present invention to provide a tape cassette with a lid at its front opening portion which allows satisfactorily sensing the tape beginning end and tape-end.

It is a further object of the present invention to provide a tape cassette with a tape-end sensing means suitable for use with a PCM (pulse code modulated) signal recording and reproducing apparatus.

According to one aspect of the present invention there is provided a tape cassette provided with a lid for protecting a tape stretched over a front opening portion of a cassette casing comprising:

(a) means for rotatably supporting said lid at both side portions of said cassette casing;

(b) a pair of first apertures formed through a side portion of said lid;

(c) a second aperture formed through said cassette casing of said tape cassette; and (d) a sensor chip provided inside said cassette casing for forming an optical path in correspondence with said second aperture which transverses a tape transport path, said first and second apertures being so located that when said tape cassette is in a using state with said lid opened, said first aperture communicates with said second aperture, while when said tape cassette is in a non-using state with said lid closed, said first aperture and said second aperture are displaced from one another to allow said lid side portions to close said second aperture thus blocking off said sensor chip disposed inside said tape cassette casing.

The other objects, features and advantages of the present invention will become apparent from the following description taken in conjunction with the accompanying drawings through which the like references designate the same elements and parts.

BRIEF DESCRIPTION OF THE DRAWINGS

FIG. 2 is an exploded perspective view of the tape cassette shown in FIG. 1;

DESCRIPTION OF THE PREFERRED EMBODIMENT

An embodiment of a tape cassette according to the present invention will hereinafter be described with reference to FIGS. 1 to 5.

Figure 1:
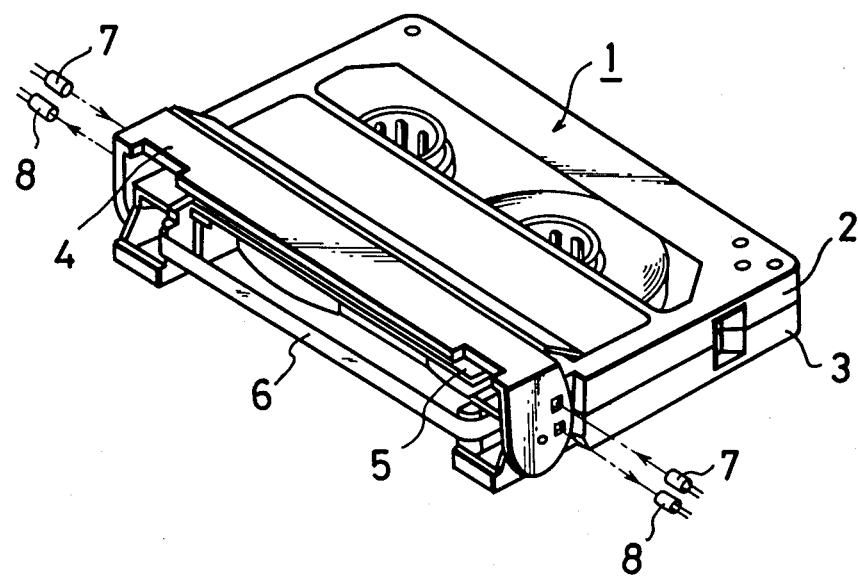
FIG. 1 is a perspective view of an embodiment of a tape cassette according to the present invention.

In FIG. 1, reference numeral 1 generally designates a tape cassette which is loaded to and used by a PCM signal recording and reproducing apparatus (not shown). This tape cassette 1 consists of an upper half 2 and a lower half 3. Also, this tape cassette 1 is provided with a front lid 4 and a back or inside lid 5 to protect a tape 6 stretched over the front opening portion of the cassette casing 1.

Further, in this tape cassette 1, as will be shown in detail by an exploded view in FIG. 2, a window 16 is formed through the upper half 2 and reference numeral 16a designates a window plate made of transparent synthetic-resin to close the window 16 is provided. Between the upper half 2 and the lower half 3 are incorporated in turn a transparent sheet 21, a pair of hubs 22,22 around which the tape 6 is wound, and which transport the tape 6 in the path shown in FIG. 1, under a conventional external drive mechanism, not shown. Lastly a transparent sheet 23 is provided. The front lid 4 and the inside lid 5, provided with a lid coil spring 20, are rotatably supported to the upper half 2 and the lower half 3 so as to freely be opened or closed. In the lower half 3, there are provided a pair of lubricant annular washers 24,24 and a brake device which is formed of a hub brake plate 25 and a brake leaf spring 26. Further, an unintentional-erase preventing member 17 and a lid lock 18 are provided on the lower half 3. Then, the upper half 2 and the lower half 3 are fastened integral by engaging projections 27 and screws 28.

Figure 3:
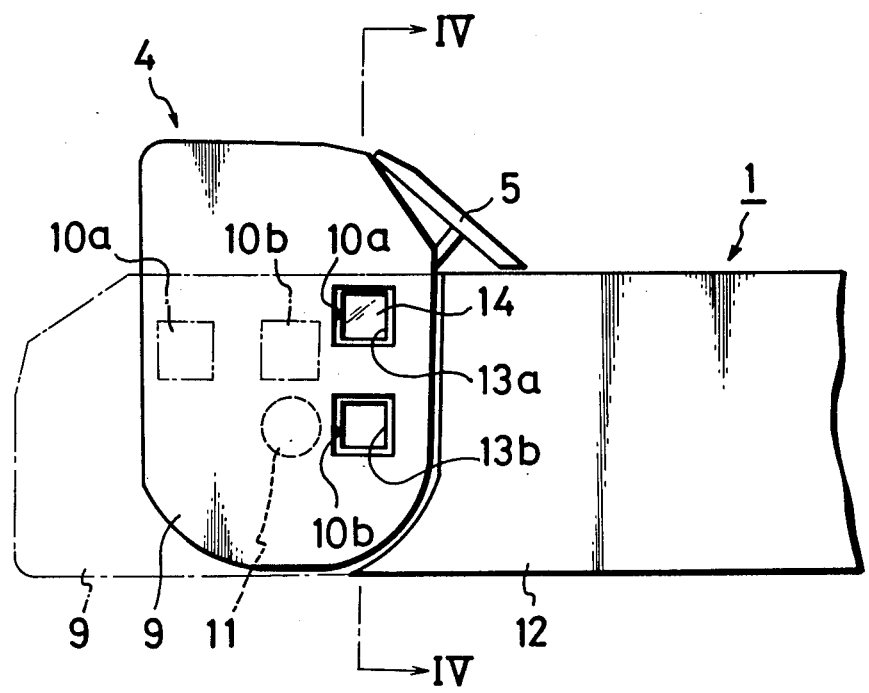
FIG. 3 is a side view illustrating a main part of FIG. 1.

When the tape cassette 1 thus constructed is used, the front lid 4 and the back lid 5 are opened to expose the tape 6 stretched over the front opening portion of the cassette casing as shown in FIG. 1, while during non-use, the front lid 4 and the back lid 5 are closed in the dotted line position of FIG. 3, to protect the tape 6 with its front and back surfaces. According to this tape cassette 1, it is possible to inspect the wound amount and the winding state of the tape 6 wound on the hubs 22 through the transparent window 16 and the transparent sheet 21.

Further in the tape cassette 1 according to this embodiment, as shown in FIG. 3, two square apertures 10a, 10b are respectively formed through lid side portions 9 of the front lid 4, and two square apertures 13a, 13b are respectively formed through casing side portions 12 of the tape cassette 1 so as to communicate with the above two square apertures 10a, 10b when the front lid 4 is rotated around an axis pin 11 upwards to be in the open state.

Figure 4:
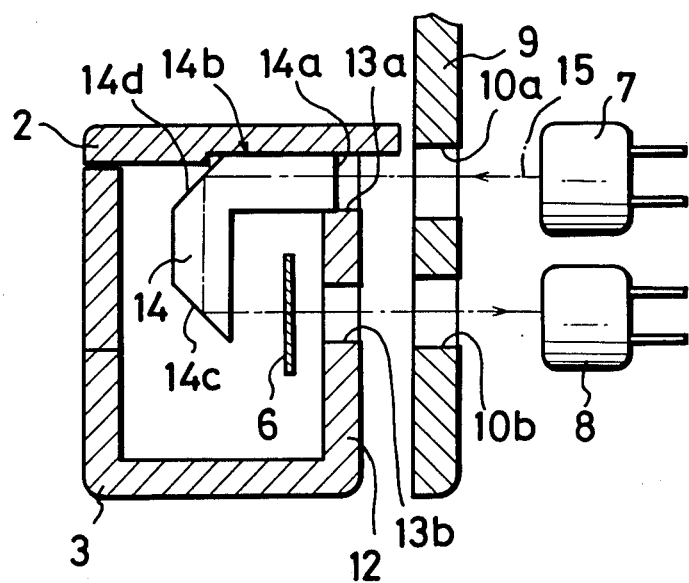
FIG. 4 is a cross-sectional side view taken along a line IV—IV in FIG. 3.

As shown in FIG. 4, a sensor chip 14, which is made of transparent synthetic resin or the like and has an approximately L-shaped cross-section, is attached to the inside of each of the square apertures 13a of the lid side portions 12 of the tape cassette 1 to introduce a light therethrough.

Figure 5:
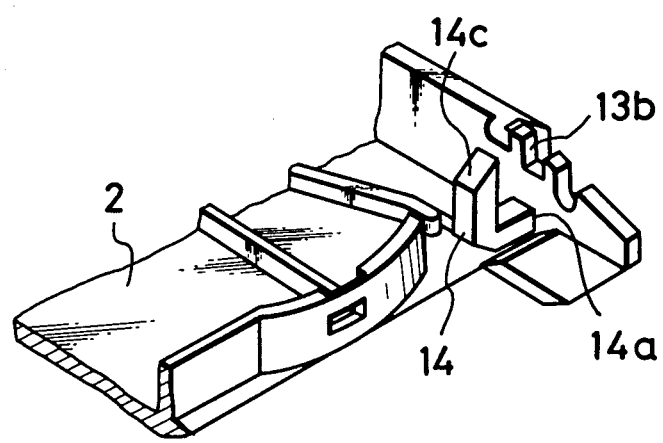
FIG. 5 is a partially cut-out perspective view illustrating a main part of the inside of the upper half in FIG. 1.

Each of the sensor chips 14, as shown in FIG. 4 which is the front view of its attaching main part and in perspective view of FIG. 5 which shows the same with the upper half 2 upside down, is attached such that a light incident surface end portion 14a of the sensor chip 14 is fitted into the square aperture 13a formed through the upper side of a casing side portion 12 or that the sensor chip 14 is fitted into the square aperture 13a formed through the chip 14 with its light incident surface end portion 14a being fitted into the square aperture 13a is bonded along its side surface 14b to the inside surface of the upper half 2. The sensor chip 14 is disposed such that the optical path passing through the square aperture crosses the tape transport path. In other words, each of the sensor chips 14 is disposed such that the tape 6 is transported in the space between a reflection end portion 14c of the sensor chip 14 and the square aperture 13b of the casing side portion 12.

When the above tape cassette 1 is loaded onto a PCM signal recording and reproducing apparatus not shown and used for recording and reproducing the PCM signal, as shown in FIG. 1, the front lid 4 and the back lid 5 of the tape cassette 1 are brought into the open state and a light emitting element 7 and a light receiving element 8, which constitute a tape-end sensing apparatus to detect or sense the leader tape of the tape 6, are disposed at a predetermined position outside each of the both side portions of the front opening portion of the tape cassette 1.

As shown by an optical path 15 in FIG. 4, the light emitted from the light emitting element 7, which is provided in the recording and reproducing apparatus, passes through the square apertures 10a and 13a, is introduced from the incident surface end portion 14a of the sensor chip 14 thereinto, reflected on the reflection surfaces formed on the angled reflection surface 14d and the reflection end portion 14c, passed through the tape 6 and the square apertures 13b, 10b and is incident on the light receiving element 8.

When the tape 6 intersecting the optical path 15 is a magnetic tape on which a magnetic recording and reproducing surface is formed, the light is interrupted thereby and does not reach the light receiving element 8, while when the tape 6 is the transparent leader tape, such light is passed through the tape 6 and introduced into the light receiving element 8. Accordingly, the leader tape can be detected by whether or not the light is incident on the light receiving element 8. As a result, it becomes possible for the PCM signal recording and reproducing apparatus to stop its recording operation or to perform its auto reverse operation by detecting the tape beginning and tape-end.

When the tape cassette 1 of this embodiment is in its non-use state, as shown in dotted lines in FIG. 3, the front lid 4 is rotated around the axial pin 11 and closed so that in association therewith, the two square apertures 10a, 10b of each of the lid side portions 9 are displaced from the two square apertures 13a, 13b of each of the casing side portions of the tape cassette 1, with the square apertures 13a 13b thus being covered with the lid side portion 9. Therefore, the incident surface end portion 14a of the sensor chip 14 can be prevented from being scratched or damaged from the outside.

Since the sensor chip 14 of this embodiment is disposed at the inside of the tape cassette 1, its reflection end portion 14c or the like is protected from being scratched or damaged from the outside. Thus the sensor chip 14 cannot be scratched or dirtied and hence the apparatus is reliable.

Furthermore, when the tape cassette 1 is in a non-used condition the two square apertures 10a, 10b of the lid side portions 9 are respectively displaced from the square apertures 13a, 13b of the casing side portions 12 of the tape cassette 1 and the square apertures 13a, 13b of the casing side portions 12 are covered with the lid side portions 9, whereby dust or the like is prevented from entering into the tape cassette 1.

The above description is given on a single preferred embodiment of the invention, but it will be apparent that modifications and variations could be effected by one skilled in the art without departing from the spirit or scope of the novel concepts of the invention, so that the scope of the invention should be determined by the appended claims only.

We claim as our invention:

1. In combination in a tape cassette having a casing, a lid with a front portion for protecting a tape stretched and transported over a front opening portion of the cassette casing and side portions extending therefrom,
    (a) means for pivotally supporting said lid side portions at both side portions of said cassette casing;
    (b) first and third apertures formed through a side portion of said lid;
    (c) second and fourth apertures formed through said cassette casing of said tape cassette; and
    (d) a sensor chip provided inside said cassette casing and optically exposed to said second and fourth apertures to provide for an optical path from outside said cassette casing through one of said second and fourth apertures, through said sensor chip and said tape and back outside said cassette casing through the other of said second and fourth apertures, said apertures being positioned that when said tape cassette is in a using state with said lid opened, said first and third apertures are aligned with said second and fourth apertures and the optical path is clear except for the tape while when said tape cassette is in a non-using state with said lid closed, said first and third apertures are unaligned with said second and fourth apertures and said lid side portions close off said second and fourth apertures protecting said sensor chip disposed inside said tape cassette casing.

* * * * *